(12) United States Patent
Gosselin (10) Patent No.: US 9,387,542 B2
(45) Date of Patent: Jul. 12, 2016

(54) INTEGRATED CLAMPING SYSTEM FOR MACHINE TOOLS

(71) Applicant: James Gosselin, Westfield, MA (US)

(72) Inventor: James Gosselin, Westfield, MA (US)

(73) Assignee: James Gosselin, Westfield, MA (US)

( * ) Notice: Subject to any disclaimer, the term of this patent is extended or adjusted under 35 U.S.C. 154(b) by 122 days.

(21) Appl. No.: 14/010,625

(22) Filed: Aug. 27, 2013

(65) Prior Publication Data

US 2014/0099171 A1    Apr. 10, 2014

Related U.S. Application Data

(60) Provisional application No. 61/703,819, filed on Sep. 21, 2012.

(51) Int. Cl.

| B23B 31/113 | (2006.01) |
| B23C 5/26 | (2006.01) |
| B23Q 3/12 | (2006.01) |
| B23B 31/00 | (2006.01) |
| B23B 31/02 | (2006.01) |
| B23B 31/107 | (2006.01) |
| B23B 31/11 | (2006.01) |
| B23B 31/40 | (2006.01) |
| B27B 5/30 | (2006.01) |

(52) U.S. Cl.
CPC ............... *B23C 5/26* (2013.01); *B23B 31/006* (2013.01); *B23B 31/02* (2013.01); *B23B 31/1075* (2013.01); *B23B 31/113* (2013.01); *B23B 31/1122* (2013.01); *B23B 31/4073* (2013.01); *B23Q 3/12* (2013.01); *B27B 5/30* (2013.01); *Y10T 29/49948* (2015.01); *Y10T 279/17965* (2015.01); *Y10T 409/30952* (2015.01)

(58) Field of Classification Search
CPC ...... B23Q 3/12; B23B 31/113; B23B 31/006; B23B 31/1107; B23B 31/1122; B23B 2231/0288; B23B 2231/0292; B23B 2240/04; Y10T 279/17965; Y10T 409/30952
USPC .......................................... 279/103; 409/234
See application file for complete search history.

(56) References Cited

U.S. PATENT DOCUMENTS

| 1,034,723 | A | * | 8/1912 | Mueller et al. | ......... B23B 31/113 279/103 |
| 1,087,330 | A | * | 2/1914 | Smith | ................... B23B 51/123 279/103 |
| 1,412,469 | A | * | 4/1922 | Jimerson | ................. B23B 31/00 279/101 |
| 1,578,311 | A | * | 3/1926 | Grosset | ................... B23B 31/02 279/91 |
| 1,618,998 | A | * | 3/1927 | Redinger | .............. B23B 31/113 279/904 |

(Continued)

FOREIGN PATENT DOCUMENTS

| CH | 445258 A | * | 10/1967 | ............. B23B 31/113 |
| DE | 2831660 A1 | * | 3/1979 | ............... B23B 31/00 |

(Continued)

*Primary Examiner* — Daniel Howell
(74) *Attorney, Agent, or Firm* — Grogan, Tuccillo & Vanderleeden, LLP (57) ABSTRACT

An integrated clamping system for a machine tool includes a male locating taper and a tool holder integrally formed therewith and extending therefrom. The male locating taper is configured to be received by a female tapered holding fixture of the machine tool. The tool holder has an axial bore for slidably receiving a machining tool. The male locating taper is also provided with a circumferential groove for receiving cam lobes of a locking cam nut to secure the machining tool to the machine.

16 Claims, 12 Drawing Sheets

(56) References Cited

U.S. PATENT DOCUMENTS

| | | | | | |
|---|---|---|---|---|---|
| 2,511,416 | A | * | 6/1950 | Rundorff | B23B 31/113 279/89 |
| 2,579,082 | A | * | 12/1951 | Kramer | B23B 31/113 279/103 |
| 2,611,621 | A | * | 9/1952 | Patterson | B23B 31/113 279/902 |
| 2,816,770 | A | * | 12/1957 | De Vlieg | B23B 31/103 279/77 |
| 3,112,117 | A | * | 11/1963 | Wahlstrom | B23B 31/113 279/8 |
| 3,144,736 | A | * | 8/1964 | Rusk | B24B 41/002 279/103 |
| 3,197,219 | A | * | 7/1965 | Wahlstrom | B23B 31/113 279/904 |
| 3,521,507 | A | * | 7/1970 | Yogus | B23B 29/03407 407/37 |
| 3,680,415 | A | * | 8/1972 | Takano | B23B 7/06 29/37 A |
| 3,730,540 | A | * | 5/1973 | King, Jr. | B23B 31/113 279/904 |
| 4,238,167 | A | * | 12/1980 | Brugger | B23B 31/113 279/143 |
| 4,436,463 | A | * | 3/1984 | Rea | B23B 31/113 279/144 |
| 4,629,374 | A | * | 12/1986 | Berner | B23B 31/113 279/7 |
| 6,394,466 | B1 | * | 5/2002 | Matsumoto | B23B 31/008 279/103 |

FOREIGN PATENT DOCUMENTS

| | | | |
|---|---|---|---|
| JP | 2006263831 A | * 10/2006 | |
| SE | WO 9426448 A1 | * 11/1994 | B23B 31/305 |

* cited by examiner

INTEGRATED CLAMPING SYSTEM FOR MACHINE TOOLS

CROSS REFERENCE TO THE RELATED APPLICATION

This application claims the benefit of U.S. Provisional Application No. 61/703,819, filed Sep. 21, 2012, entitled "INTEGRATED CLAMPING SYSTEM FOR MACHINE TOOLS," hereby incorporated by reference in its entirety.

FIELD OF THE INVENTION

The present invention relates generally to machine tools and, more particularly, to an integrated clamping system for machine tools.

BACKGROUND OF THE INVENTION

A machine tool is a machine for shaping and machining metal or other rigid materials, usually by cutting, boring, grinding, shearing and other forms of deformation. Examples of common machine tools include CNC machining centers and lathes. The cutting/machining of a workpiece may be carried out using a variety of cutting tools, such as end mills, boring bars, saw arbors and inserts.

Existing cutting tools typically have a round shank which is clamped in a tool holder by means of a suitable collet chuck or clamping sleeve. While existing clamping systems for cutting tools for use with machine tools are generally suitable for what is regarded as ordinary performance, there is room for improvement in terms of accuracy, rigidity, repeatability and quick change of tools. In particular, known clamping systems consist of multiple components that can flex or move as a result of vibration during operation, which provides for less then optimal rigidity and which can lead to decreased tool life. Moreover, as a result of these multiple components, tolerance stack-up can become an issue, decreasing accuracy.

SUMMARY OF THE INVENTION

It is an object of the present invention to provide an integrated clamping system for machine tools.

It is another object of the present invention to provide an integrated clamping system for machine tools that substantially eliminates or reduces tolerance stack-up issues.

It is another object of the present invention to provide an integrated clamping system for machine tools with increased tool rigidity.

It is another object of the present invention to provide an integrated clamping system for machine tools that provides a reduction in cutting time as a result of increased tool rigidity.

It is another object of the present invention to provide an integrated clamping system for machine tools that provides for increased tool life.

It is another object of the present invention to provide an integrated clamping system for machine tools that allows for quick tool change-over.

It is another object of the present invention to provide an integrated clamping system for machine tools having a simplified design.

It is yet another object of the present invention to provide an integrated clamping system for use with Swiss-type lathes, milling machines and turning machines, such as CNC machine centers and CNC turning centers, requiring both powered rotating tools and static tool operations.

It is yet another embodiment of the present invention to provide an integrated clamping system that provides for easy extraction of the clamping system from the machine tool.

It is yet another embodiment of the present invention to provide an integrated clamping system for machine tools that can accommodate various tool types sizes.

It is yet another embodiment of the present invention to provide an integrated clamping system for machine tools that provides for improved clearance in tight areas, such as near sub-spindles, guide bushings in Swiss machines, or other work holding fixtures.

These and other objects are achieved by the present invention.

An integrated clamping system for a machine tool includes a body portion configured to be received in a holding fixture of a machine, and a tool holder integrally formed with and extending longitudinally from the body portion. The tool holder has an aperture, arbor journal or insert pocket formed in a distal end thereof for receive a cutting tool.

In another embodiment, an apparatus for securing a cutting tool to a machine having a female holding fixture, such as a collet taper, is provided. The apparatus includes a male locating taper configured to be selectively received by the female holding fixture, a nose, and a circumferential groove intermediate the male locating taper and the nose. The male locating taper, the nose and the groove define a substantially rigid body. The apparatus further includes a tool holder that extends longitudinally from the body and which has an aperture in a distal end therefore for receiving the cutting tool. The tool holder is integrally formed with the body.

In another embodiment, a method for selectively securing a cutting tool to a machine is provided. The method includes the steps of forming a body portion having a male locating taper, a nose and a circumferential groove intermediate the nose and the locating taper, and integrally forming a tool holder with the body portion such that the tool holder extends from the nose of the body portion.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENT

Figure 1A:
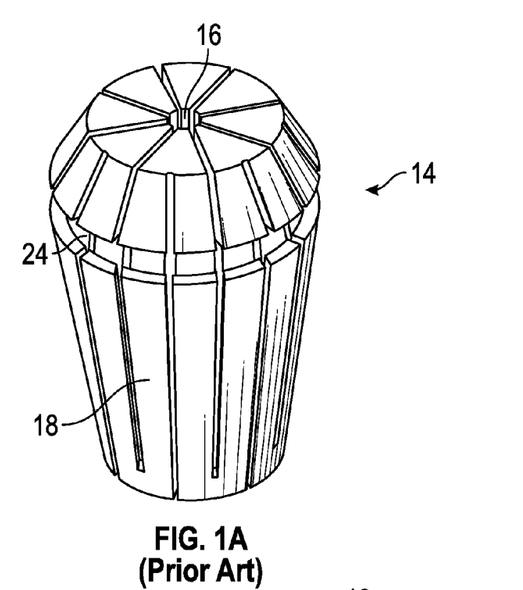
FIG. 1A illustrates a double-angle spring collet of a prior art clamping system for machine tools.
Figure 1B:
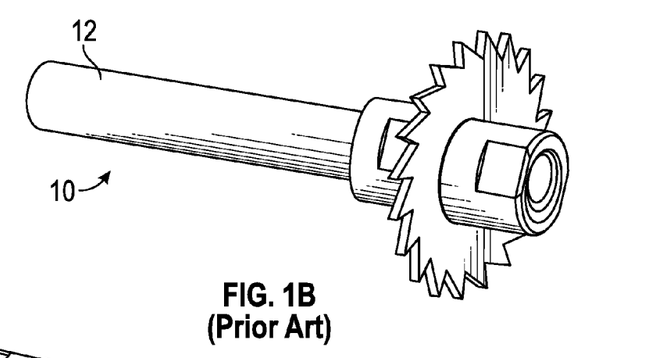
FIG. 1B illustrates a cutting tool and, in particular, a slitting saw mounted on a saw arbor, of a prior art clamping system for machine tools.
Figure 1C:
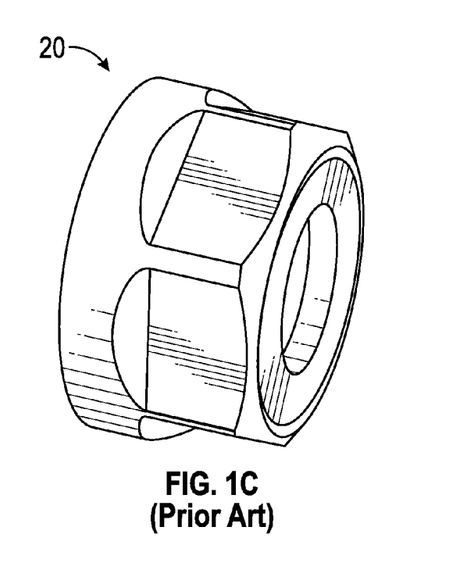
FIG. 1C illustrates a standard locking cam nut with internal cam extraction lobe of a prior art clamping system for machine tools.
Figure 2A:
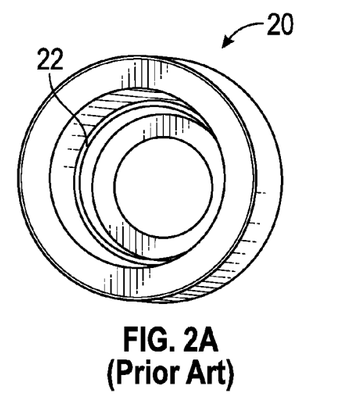
FIG. 2A-2E illustrate a variety of prior art cam nuts that may be utilized with the prior art clamping system of FIGS. 1A-1C.
Figure 2B:
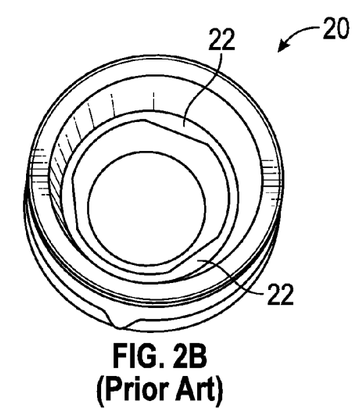
Figure 2C:
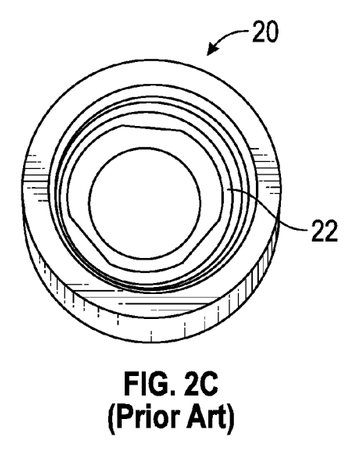
Figure 2D:
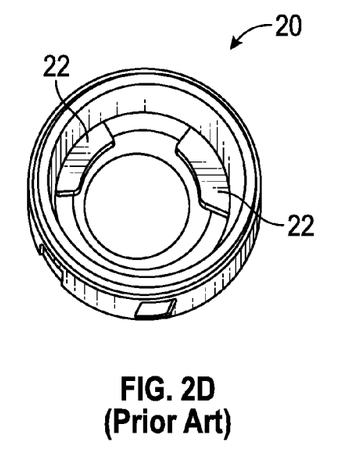
Figure 2E:
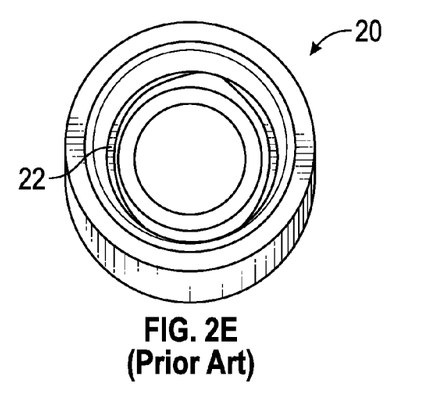

FIGS. 1A-1C depict a known clamping system for clamping a cutting tool, such as a saw arbor 10, to a machine. As shown therein, the saw arbor has a generally cylindrical shank 12 which is received in a center bore 16 of a dual-angle spring collet 14 having tapered sides 18. The spring collet 14 is received in a female tapered holding fixture (not shown) on the machine. A nut 20 is placed over the collet 14 and secures the collet 14, and cutting tool, to the machine. As shown in FIG. 2, existing nuts 20 may include differing configurations of cam lobes 22 on the internal surface thereof. The cam lobe or lobes 22 of the cam nut 20 lock into the external groove 24 on the collet 14 providing for a means for extraction, as is known in the art. This cam feature extracts the collet 14 from the female tapered holding fixture, breaking the locked mate of the two tapers (taper on the collet 14 with the taper on the holding fixture) by exerting pressure from the cam lobes 24 on the outward face of the groove 24 in the collet 14.

As stated, such known clamping systems involve multiple parts that are prone to tolerance stack-up issues and which can flex or move due to vibrations during operation, resulting in decreased accuracy during operation.

Turning now to FIGS. 3-6, embodiments of the inventive integrated clamping system are shown. As show therein, the integrated clamping system 100 includes a male locating taper 102 and a tool holder 104 integrally formed with the male locating taper. The male locating taper 102 is dual-angled and is generally similar in shape and angle to the dual-angle collet 14 described above. The male locating taper 102 also has truncated clearance portions 106 located on the nose 109 thereof, and a circumferential groove 107, which will be discussed in detail hereinafter.

Figure 3:
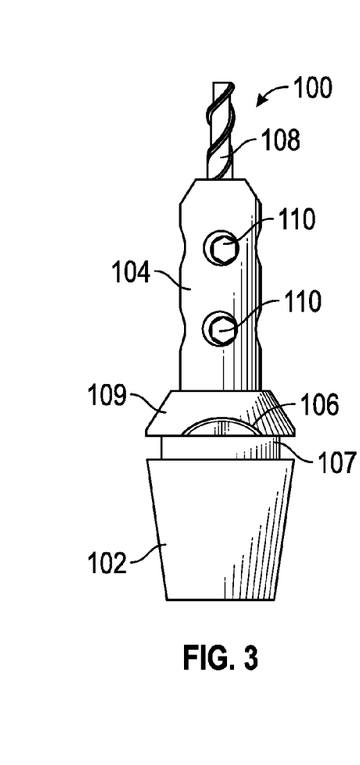
FIG. 3 illustrates an integrated clamping system having an end mill, in accordance with an embodiment of the present invention.
Figure 4:
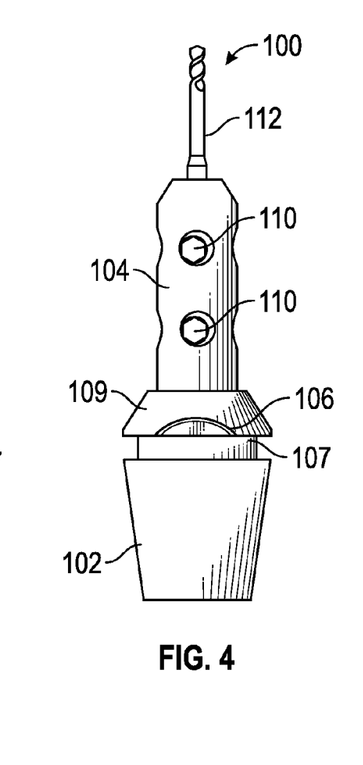
FIG. 4 illustrates an integrated clamping system having a boring bar, in accordance with an embodiment of the present invention.

As shown in FIGS. 3-6, the tool holders 104 have different configurations depending on the type of tool being used. For example, FIG. 3 shows the integrating clamping system 100 being utilized in conjunction with an end mill tool 108. As shown therein, the end mill 108 is slidably received in a bore in the tool holder 104 and held in place by one or more set screws 110. FIG. 4 shows the integrated clamping system 100 being utilized in conjunction with a boring bar 112. As with the end mill 108, the boring bar tool 112 is slidably received in the bore in the tool holder 104 and is held in place by set screws 110.

Figure 5:
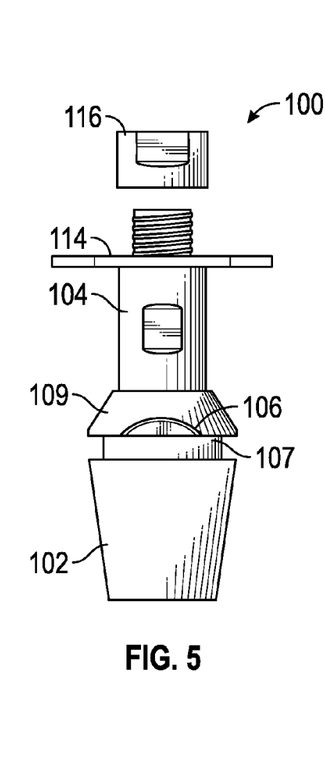
FIG. 5 illustrates an integrated clamping system having a saw arbor, in accordance with an embodiment of the present invention.
Figure 6:
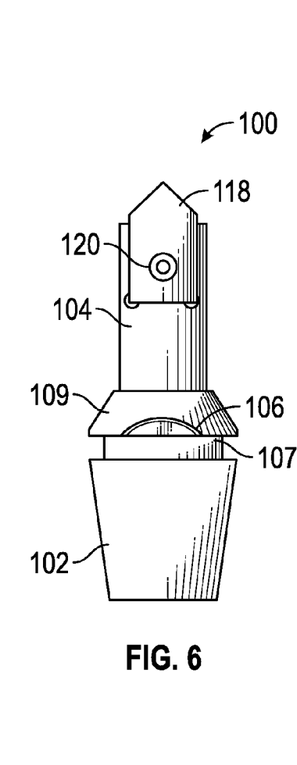
FIG. 6 illustrates an integrated clamping system having an insert tool, in accordance with an embodiment of the present invention.

FIG. 5, shows the integrated clamping system 100 being utilized in conjunction with a saw arbor 114. As shown therein, the tool holder 104 is of a somewhat different configuration than that used with the end mill 108 and boring bar 112, and has a nut 116 which secures the saw arbor 114 to the tool holder 104. Likewise, FIG. 6 illustrates the clamping system 100 being utilized in conjunction with an insert tool 118. The insert tool 118 may be secured to the tool holder 104 through a screw or clamp 120.

Figure 7A:
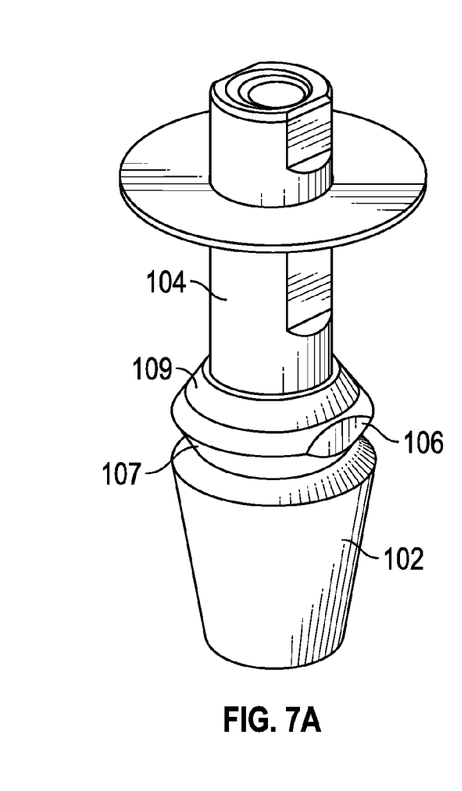
FIGS. 7A-7C illustrates the integrated clamping system being used in combination with a variety of cutting tools.
Figure 7B:
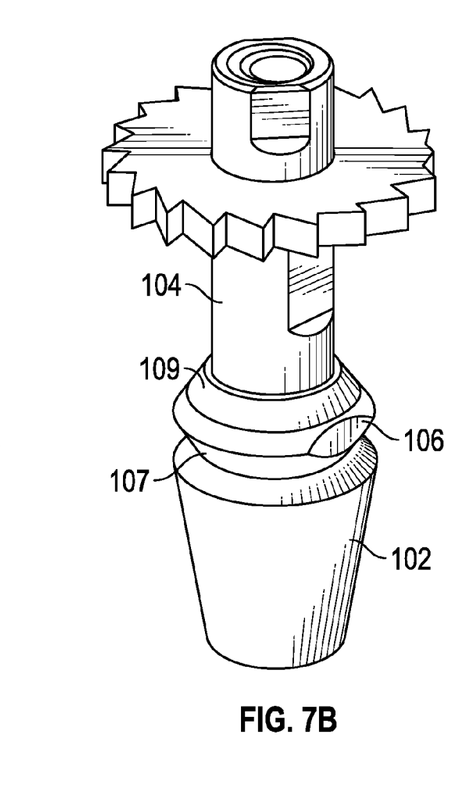
Figure 7C:
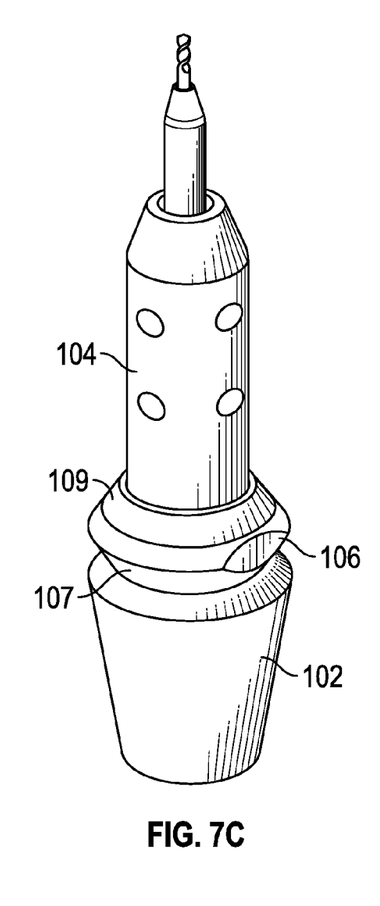

FIGS. 7A-7C also illustrate the integrated clamping system 100 with various other cutting and milling tools.

Figure 8:
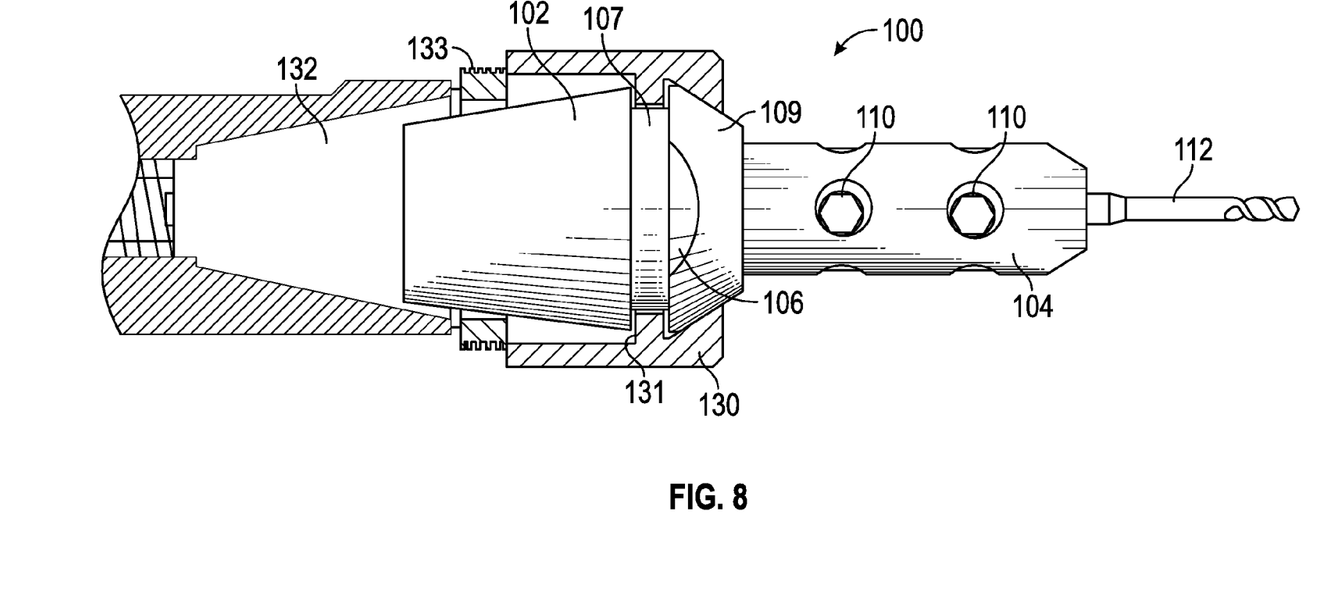
FIG. 8 is a side cross-sectional view of the integrated clamping system being received in a female holding fixture of a machine tool in accordance with an embodiment of the present invention.
Figure 9:
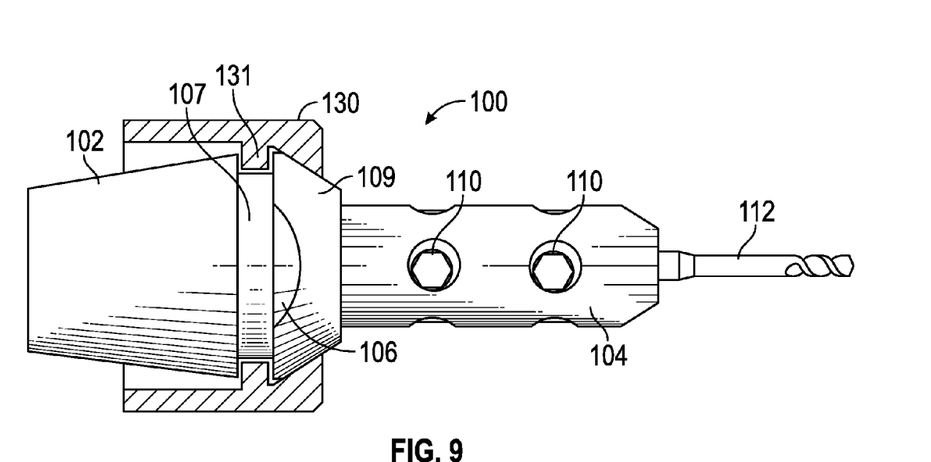
FIGS. 9-11 illustrate the engagement of a cam nut with the integrated clamping system in accordance with an embodiment of the present invention.

Turning not to FIG. 8, the manner in which the integrated clamping system 100 is utilized to secure a cutting tool, in this case boring bar 112, to a machine is shown. As shown therein, the tool holder 104 receives and secures the boring bar 112 therein via set screws 112. A nut 130 is placed over the tool holder 104 and the male locating taper 102 such that the cam lobes 131 inside of the cam nut 130 are received in the circumferential groove 107 of the male locating taper 102. The male locating taper 102 is then inserted into the correspondingly shaped female holding fixture 132 of a machine. The cam nut 130 also includes internal threads (not shown) that are received by external threads 133 on the holding fixture 132. As such, the cam nut 130 is then tightened to secure the clamping system 100, and thus the cutting tool, to the machine.

As will be readily appreciated, without the flexibility a spring collet offers, the solid construction of the integrated clamping system 100 provides no give for the locking lobes on the cam nut to slip past the nose 109 during installation. In consideration of this issue, the male locating taper 102 is provided with truncated portions 106 on the nose 109 of the male locating taper 102 in front of the circumferential groove 106 that are semi-elliptical in shape, as discussed above.

Figure 10A:
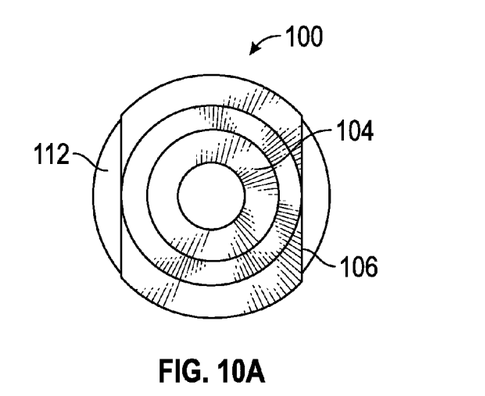
Figure 10B:
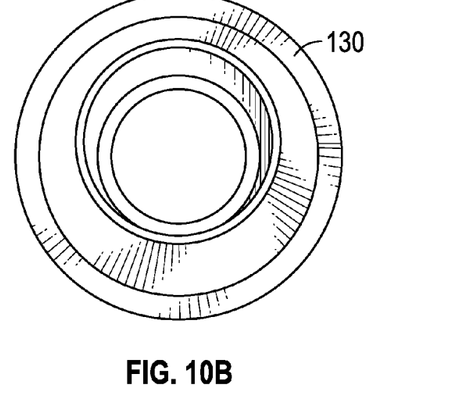
Figure 10C:
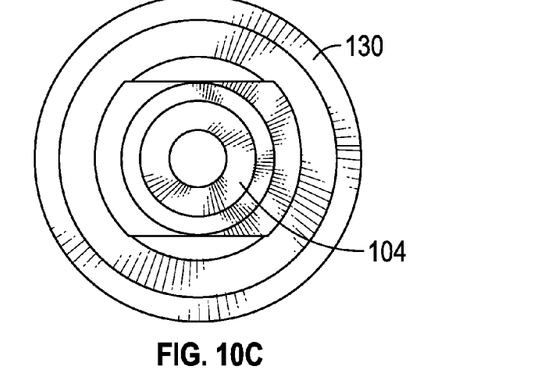

With reference to FIGS. 9 and 10A-10C, by aligning the truncated portions 106 with the relieved portion of the cam nut 130, the two parts are able to slip together, as best shown in FIGS. 10A-10C. Notably, this configuration allows the integrated clamping system 100 to be utilized with existing machines, and with existing cam nuts, such as cam nuts 20, as discussed previously, thereby providing for seamless integration with existing machines. In particular, this configuration allows the use of a standard cam nut, which in most cases is provided with the machine tool from the machine builder or collet sleeve manufacturer.

Figure 11:
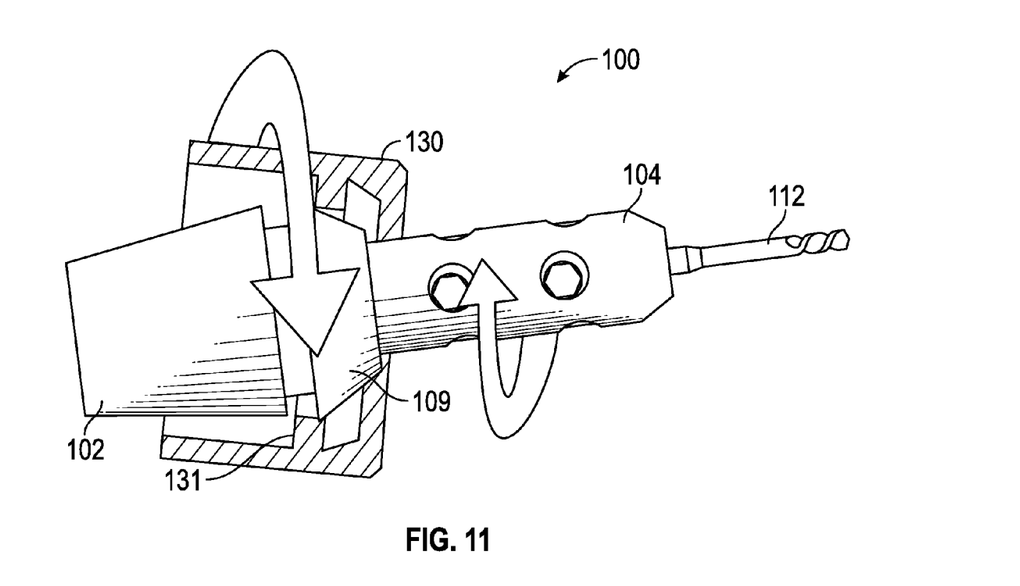

It is of note that cam nuts from different manufacturers may vary in the design of the cam lobes, as shown in FIG. 2A-2E, resulting in different fits. For some designs, the two parts may be rotated into place with ease, while others may have a tighter fit requiring the male locating taper 102 to be inserted into the nut 130 at a slight angle, as shown in FIG. 11, thus taking advantage of the skewed relationship as it enters the relieved bore and then locking into place as it is rotated.

Figure 12:
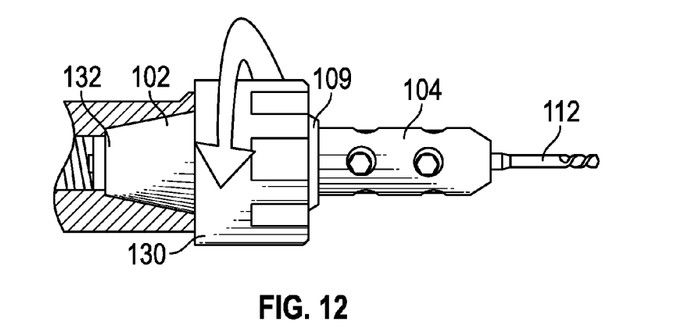
FIGS. 12-14 illustrate the removal of the integrated clamping system from a machine tool in accordance with an embodiment of the present invention.
Figure 13:
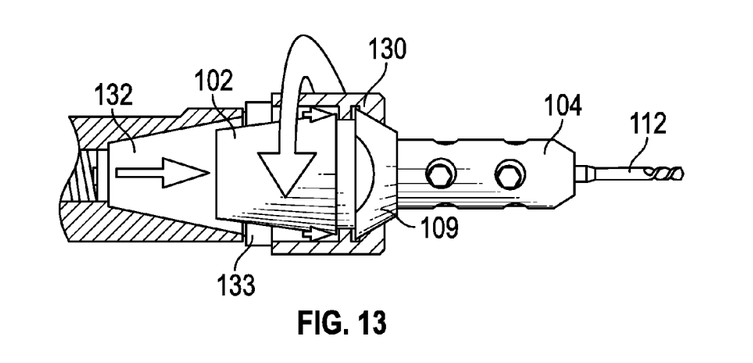
Figure 14:
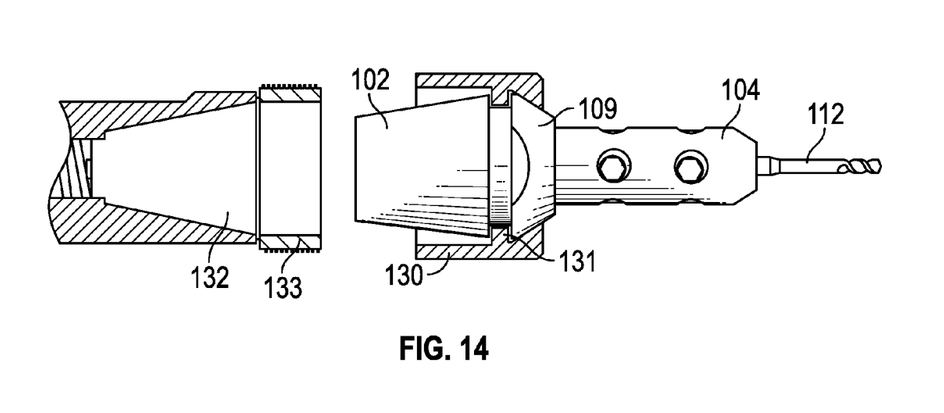
Figure 15:
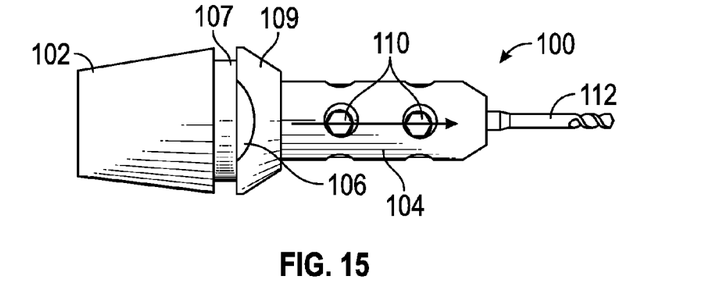
FIGS. 15-18 illustrate variations in the specifications of the integrated clamping system in accordance with an embodiment of the present invention.
Figure 16:
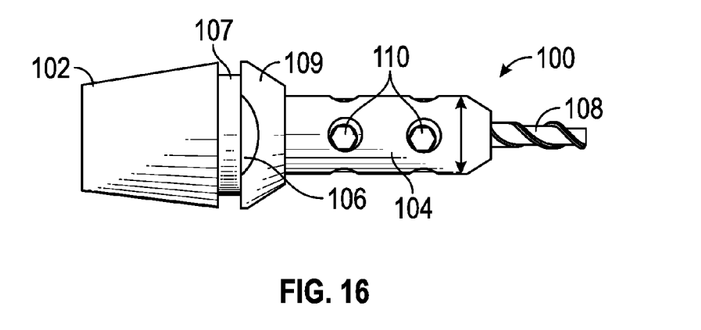
Figure 17:
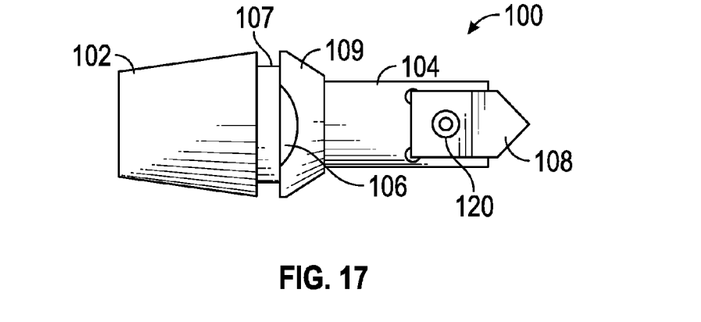
Figure 18:
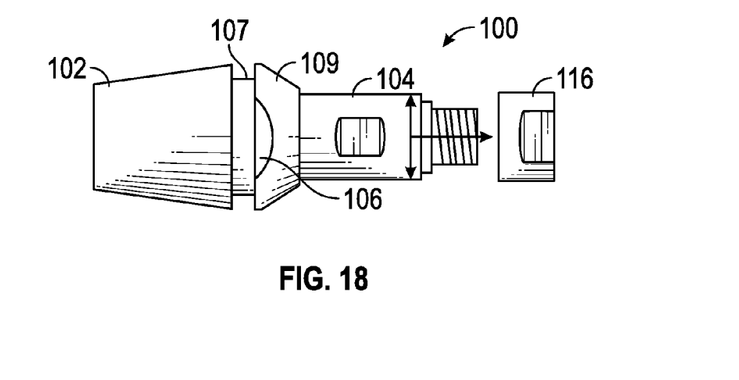

With reference to FIGS. 12-14, removal of the clamping system 100 from the female holding fixture 132 of the machine is shown. Importantly, the integrated clamping system 100 incorporates a circumferential groove 107 similar to the groove in existing spring collets for the purpose of extracting the male locating taper 102 from the corresponding female holding fixture 132. As shown therein, when the cam nut 130 is rotated slightly, the cam lobes 131 engage with the front face of the groove 107 providing the means of breaking the mated surfaces of the male locating taper 102 and female holding fixture 132 free of each other during extraction, thereby allowing the male locating taper 102 to be removed from the female holding fixture 132.

Referring again to FIGS. 3-6, the longitudinal extent of the tool holder 104 serves two functions. First, as discussed previously, it provides the physical means of holding the cutting tool, whether it be by means of a mounting hub and nut, as shown in FIG. 5 for holding a slitting saw 114, a pocket and screw or clamp to hold an indexable insert 118, as shown in FIG. 6, or by use of a bore and set screw 110 for holding end mills 108 and other round shank tools, as shown in FIGS. 3 and 4. It may also provide the physical means of holding the cutting tool by way of a groove and clamp for holding non-round shaped tool shanks, by hydraulic clamping, or shrink fit clamping. In an embodiment, this would also include holding two separate tools in one system such as a slitting saw and an end mill by combining the two fixture methods on a single unit, such as a combination saw arbor.

In an embodiment, variations in the distal end of the tool holder 104 can be utilized to accommodate various tool sizes and various extended length requirements. In other words, as the diameter of the end mill changes, the receiving bore in the tool holder 104 must also change. As the mounting hole of a slitting saw changes, the mounting hub must also change. When two slitting saws are stacked with a spacer between for gang milling, the mounting hub configuration may be different. On saw arbors, wear spacers may be utilized to prevent wear of the locating flanges. When indexable and throw inserts are used different pocket configurations and holding mechanisms can be altered as needed. When greater reach is required to clear an obstruction or to reach deeper inside of a part, the extension length of the tool holder 104 may be changed. Such variations of the tool holder 104, such as the tool holder diameter and length, are illustrated.

Figure 19:
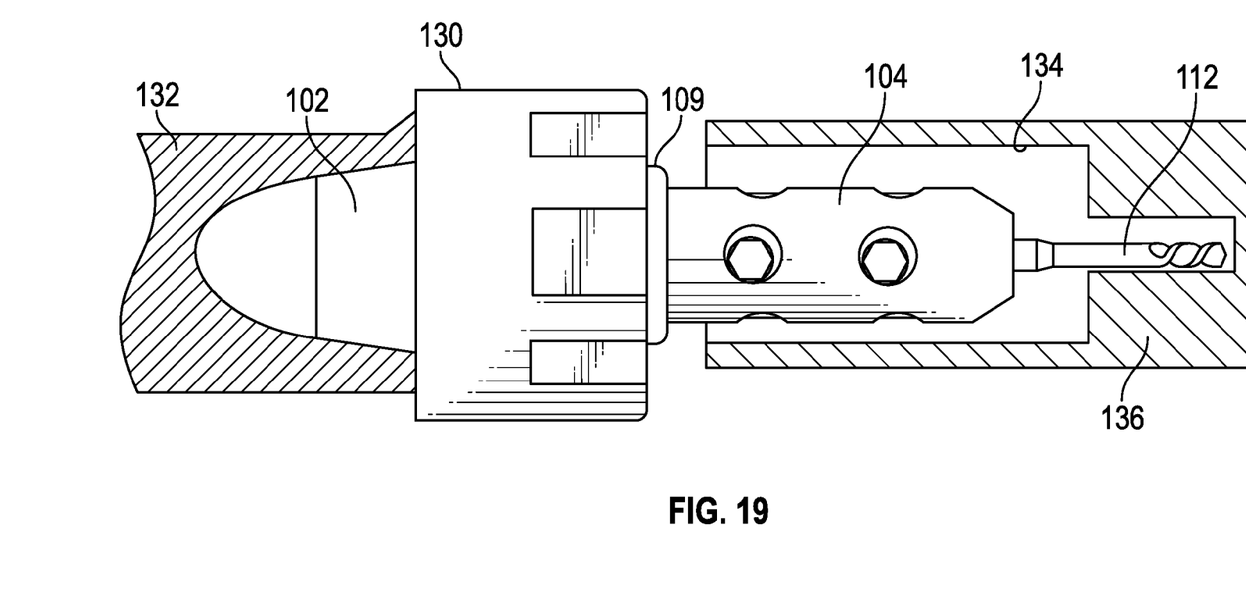
FIG. 19 illustrates the extended nose of the integrated clamping system being used to machine a workpiece in a tight space.
Figure 20:
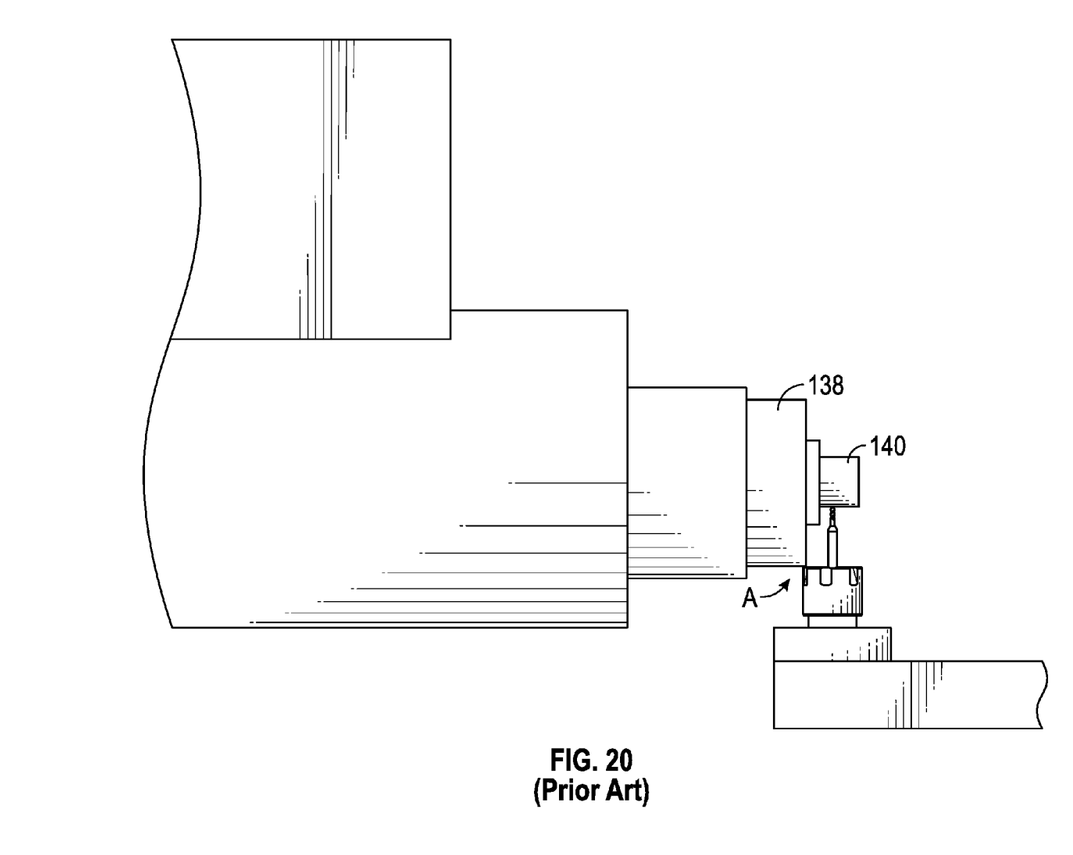
FIG. 20 illustrates a prior art clamping system and its interference with the sub-spindle of a machine.
Figure 21:
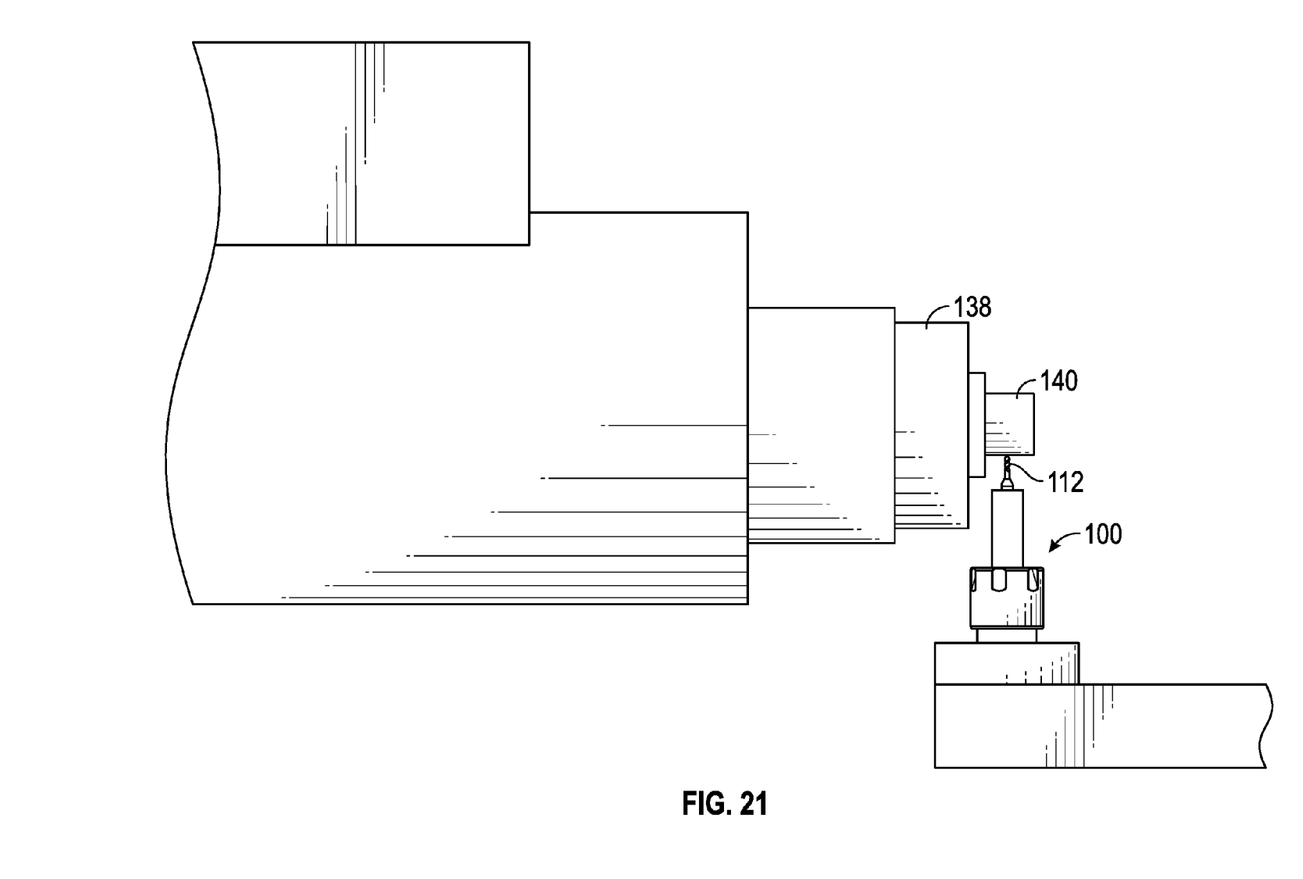
FIG. 21 illustrates the clamping system of the present invention and the manner in which it avoids interference.

Importantly, the longitudinal extent of the tool holder 104 also functions to move the cutting tip of the cutting tool farther away from the holding cam nut 130. This allows the cutting tool to reach deep inside of parts with a pre-existing bore 134 of a workpiece 136 where smaller tool operations are necessary and added tool support is required, as shown in FIG. 19. In addition, existing clamping systems are prone to interference with portions of the machine, such as with a spindle or sub-spindle 138, as shown at area A in FIG. 20. As shown in FIG. 21, however, the clamping system of the present invention 100 allows the tool 112 to reach the workpiece 140 and avoid interference with the spindle or sub-spindle 138 or other portions of the machine.

An example of tight areas of the machine can be found on machines like Swiss-type machines, also referred to as sliding head stock machines, guide bushing machines, and automatic screw machines. In such a Swiss-type machine, the workpiece is supported by a guide bushing support. Many of these machines are also equipped with a sub-spindle to perform subsequent operations automatically after the parts are transferred from the primary operation holding device. When milling, drilling or other various operations are performed in a rotating tool position, they are generally held by a spring collet and the cam nut similar to that illustrates in FIGS. 1A-1C. As the tool diameter is reduced (e.g., a ⅛" diameter end mill), tool rigidity decreases and tool deflection increases as the working part of the tool is extended out of the holding collet in order to clear obstructions. These obstructions generally would be the large diameter of the guide bushing housing or sub-spindle or other part of the machine. Therefore, without expanding the tool the cam nut would crash into the guide bushing or sub-spindle. The present invention solves these problems by providing an integrated clamping system having an extended tool holder 104. The length of the tool holder 104 provides extension of the cutting tool in order to keep these larger parts of the machine from contacting one another.

As will be readily appreciated, the integrated clamping system of the present invention provides a simplified design in which the locating taper 102 and the tool holder 104, be it a saw arbor tool holder, insert holder, or cutting tool extension are a single, integrated component. In addition, the integrated clamping system 100 provides for increased rigidity, in that greater cutting stability is achieved by eliminating multiple components that can flex or move as a result of vibration. The male locating taper 102 is locked with the female holding fixture 132, directly, and cutting vibration is dampened as a result of the increased rigidity of the system, as a whole. This results in the reduction of harmonic vibration during the machining process, as well as increased too life.

In addition to the above-described advantages, the integrated clamping system 100 provides for increased accuracy by eliminating tolerance stack-up of multiple components. Concentricity during rotational operations is also improved, thereby enabling more accurate machining results. Esthetics quality is also improved as a result of smoother surface finish on the workpiece due to the reduction of harmonic vibration.

Moreover, productivity gains may be realized with more uniform and efficient cutting. As will be readily appreciated, the increase of tool life enables the machine to remain in production for longer periods of time with fewer tool changes of dull tools. Additionally, further gains in productivity can be realized with the benefit of increased cutting velocity, which is possible by reducing harmonic vibrations.

Importantly, the integrated clamping system 100 provides a repeatable solution for quickly changing tools into a fixed location. Positioning variables are eliminated by replacing the spring collet of prior art clamping mechanism and the separate tool holder shank with the integrated clamping system's solid body which is rigidly fixtured to positive stop surfaces. In particular, the body portion (defined by the male locating taper 102, nose 109 and groove 107) is substantially rigid. As used herein, "substantially rigid" means that the body portion of the clamping system cannot be compressed or expanded in a direction substantially perpendicular to the axis of rotation when inserted into the female holding fixture and secured in place by a cam nut. This is in contrast to existing spring collets which can be compressed or expanded to accommodate a tool directly therein and to lock the tool to a machine. In addition, with the integrated clamping system 100, tools can be preset outside of the machine with predictable tool setup results.

While the present invention has been described in connection with Swiss-type machines, the integrated clamping system 100 may also be utilized in conjunction with any top of machine tool known in the art including, but not limited to, milling machines and turning machines. In addition, the clamping system may be utilized on machines requiring both power rotating tools and static tool operations.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A clamping system for machine tools, comprising:
a body portion configured to be received in a holding fixture of a machine, said body portion including a male locating taper, a nose having a taper angled generally opposite of said male locating taper and pair of opposed clearance portions, and a circumferential groove intermediate said male locating taper and said nose, said groove separating said taper of said nose from said male locating taper; and
a tool holder integrally formed with and extending longitudinally from said body portion, said tool holder having an aperture or journal formed in a distal end thereof for receive a cutting tool;
wherein said opposed clearance portions are configured to allow insertion of a cam nut onto said body portion such that a front surface of said cam nut is positioned rearward of a front surface of said nose in order to secure said body portion to a machine; and
wherein said circumferential groove is configured to receive cam lobes of said cam nut.

2. The clamping system of claim 1, wherein:
said cutting tool is an end mill.

3. The clamping system of claim 1, wherein:
said cutting tool is a boring bar.

4. The clamping system of claim 1, wherein:
said cutting tool is a saw arbor.

5. The clamping system of claim 1, wherein:
said cutting tool is an insert tool.

6. The clamping system of claim 1, wherein:
said male locating taper, said nose and said circumferential groove define said body, said body being entirely rigid and unitary.

7. An apparatus for securing a cutting tool to a machine having a female holding fixture, said apparatus comprising:
a male locating taper configured to be selectively received by said female holding fixture, a nose, and a circumferential groove intermediate said male locating taper and said nose, said male locating taper, said nose and said groove defining a substantially rigid body; and
a tool holder extending longitudinally from said body and having an aperture or journal in a distal end therefore for receiving said cutting tool, said tool holder being integrally formed with said body;
wherein said nose has a taper angled generally opposite of said male locating taper and pair of opposed clearance portions includes a pair of opposed clearance portions configured to allow insertion of a cam nut onto said body portion such that a front surface of said cam nut is positioned rearward of a front surface of said nose, in order to secure said body portion to a machine; and
wherein said circumferential groove is configured to receive cam lobes of said cam nut.

8. The apparatus of claim 7, wherein:
said cutting tool is an end mill.

9. The apparatus of claim 7, wherein:
said end mill is secured to said tool holder by a set screw.

10. The apparatus of claim 7, wherein:
said cutting tool is a boring bar.

11. The apparatus of claim 7, wherein:
said cutting tool is a saw arbor.

12. The apparatus of claim 7, wherein:
said cutting tool is an insert tool.

13. The apparatus of claim 7, wherein:
said machine is a Swiss-type machine.

14. A method for selectively securing a cutting tool to a machine, said method comprising the steps of:
forming a body portion having a male locating taper, a nose having a taper angled generally opposite of said male locating taper, and a circumferential groove intermediate said nose and said locating taper;
forming a pair of opposed clearance portions on said nose, said opposed clearance portions being configured to allow insertion of a cam nut onto said body portion such that a front surface of said cam nut is positioned rearward of a front surface of said nose in order to secure said body portion to a machine; and
integrally forming a tool holder with said body portion, said tool holder extending from said nose of said body portion.

15. The method according to claim 14, further comprising the steps of:
inserting a cutting tool in said tool holder; and
securing said cutting tool to said tool holder with a set screw.

16. The clamping system of claim 1, wherein:
said clearance portions are semi-elliptical in shape.

* * * * *